US009117284B2

(12) United States Patent
Nienhaus et al.

(10) Patent No.: US 9,117,284 B2
(45) Date of Patent: Aug. 25, 2015

(54) ASYNCHRONOUS COMPUTE INTEGRATED INTO LARGE-SCALE DATA RENDERING USING DEDICATED, SEPARATE COMPUTING AND RENDERING CLUSTERS

(71) Applicant: Nvidia Corporation, Santa Clara, CA (US)

(72) Inventors: Marc Nienhaus, Berlin (DE); Joerg Mensmann, Berlin (DE); Hitoshi Yamauchi, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 143 days.

(21) Appl. No.: 13/719,472

(22) Filed: Dec. 19, 2012

(65) Prior Publication Data

US 2014/0168230 A1  Jun. 19, 2014

(51) Int. Cl.
*G06F 15/80* (2006.01)
*G06T 1/20* (2006.01)
*G06F 9/50* (2006.01)

(52) U.S. Cl.
CPC .... *G06T 1/20* (2013.01); *G06F 9/50* (2013.01)

(58) Field of Classification Search
CPC . G06T 1/20; G06T 2210/52; G06F 15/17337; G06F 15/17381; G06F 9/52
USPC ......................................................... 345/505
See application file for complete search history.

(56) References Cited

U.S. PATENT DOCUMENTS 7,812,843 B2 * 10/2010 Alcorn .......................... 345/505
2003/0158886 A1 * 8/2003 Walls et al. ................... 709/201

OTHER PUBLICATIONS

Xavier Cavin et al. "COTS Cluster-based Sort-last Rendering: Performance Evaluation and Pipelined Implementation" IEEE Visualization 2005, Oct. 23-28.*
Stefan Eilemann et al. "Equalizer: A Scalable Parallel Rendering Framework" IEEE Transactions on Visualization and Computer Graphics, vol. 15, No. 3, May/Jun. 2009.*
Jeremie Allard et al. "A Shader-Based Parallel Rendering Framework" IEEE Visualization Oct. 23-28, 2005.*

* cited by examiner

Primary Examiner — Hau Nguyen

(57) ABSTRACT

An asynchronous computing and rendering system includes a data storage unit that provides storage for processing a large-scale data set organized in accordance to data subregions and a computing cluster containing a parallel plurality of asynchronous computing machines that provide compute results based on the data subregions. The asynchronous computing and rendering system also includes a rendering cluster containing a parallel multiplicity of asynchronous rendering machines coupled to the asynchronous computing machines, wherein each rendering machine renders a subset of the data subregions. Additionally, the asynchronous computing and rendering system includes a data interpretation platform coupled to the asynchronous rendering machines that provides user interaction and rendered viewing capabilities for the large-scale data set. An asynchronous computing and rendering method is also provided.

21 Claims, 6 Drawing Sheets

ASYNCHRONOUS COMPUTE INTEGRATED INTO LARGE-SCALE DATA RENDERING USING DEDICATED, SEPARATE COMPUTING AND RENDERING CLUSTERS

TECHNICAL FIELD

This application is directed, in general, to data processing and, more specifically, to an asynchronous computing and rendering system and an asynchronous computing and rendering method.

BACKGROUND

Typically, a large-scale data set may be based on raw data that has been collected but has not undergone any form of processing. The large-scale raw data may be multiple times larger than a corresponding reduced data set. For instance, a factor of about 600 is not uncommon in the area of seismic data interpretation. That is, if a rendering system visualizes 200 GB of seismic volume data, then respective raw data could be approximately 120 TB in size. Usually, this large-scale raw data has to be preprocessed, which may require hours or even days, in order to provide a reduced data set that is capable of being further processed or manipulated for analysis in a user-interactive environment. In another aspect, preprocessing of the large-scale data set may incur unwanted (or unknown) filtering effects on the reduced data set, which in turn may provide misleading results during further analysis.

SUMMARY

Embodiments of the present disclosure provide an asynchronous computing and rendering system and an asynchronous computing and rendering method.

In one embodiment, the asynchronous computing and rendering system includes a data storage unit that provides storage for processing a large-scale data set organized in accordance to data subregions and a computing cluster containing a parallel plurality of asynchronous computing machines that provide compute results based on the data subregions. The asynchronous computing and rendering system also includes a rendering cluster containing a parallel multiplicity of asynchronous rendering machines coupled to the asynchronous computing machines, wherein each rendering machine renders a subset of the data subregions. Additionally, the asynchronous computing and rendering system includes a data interpretation platform coupled to the asynchronous rendering machines that provides user interaction and rendered viewing capabilities for the large-scale data set.

In another aspect, the asynchronous computing and rendering method includes providing data storage for processing a large-scale data set organized in accordance to data subregions and initiating asynchronous and parallel rendering, wherein each rendering corresponds to a subset of the data subregions. The method also includes instigating asynchronous and parallel computing having compute results based on the subset of the data subregions and providing user interaction and rendered viewing capabilities for the large-scale data set.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure provide a scalable system having data distribution schemes that are particularly designed for user-defined compute algorithms and may employ virtually unlimited graphics processing memory for high-performance computing algorithms. Additionally, asynchronous computing and rendering operations provide critical integration of compositing results for visualization.

Figure 1:
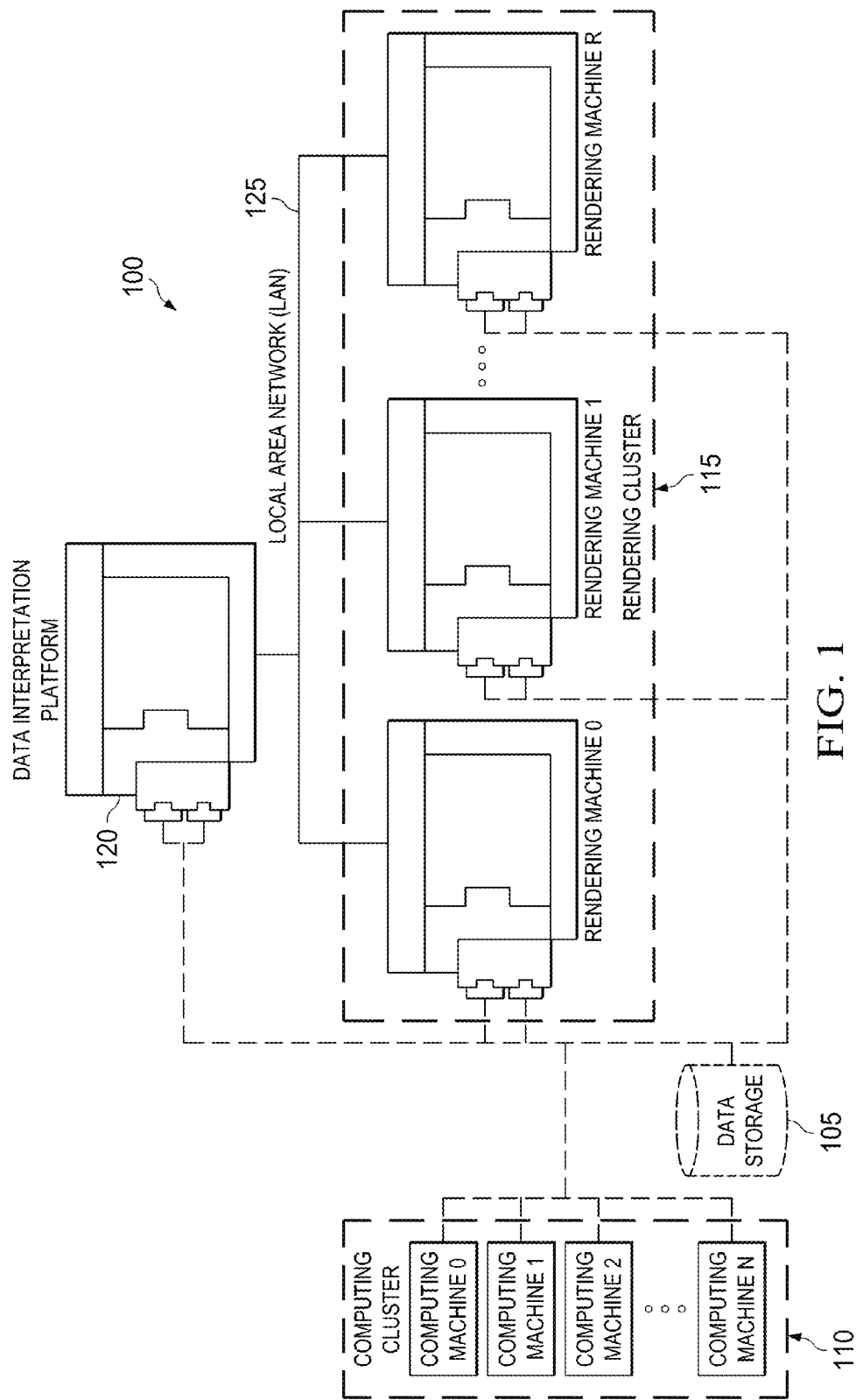
FIG. 1 illustrates a functional block diagram of an embodiment of an asynchronous computing and rendering system constructed according to the principles of the present disclosure.

FIG. 1 illustrates a functional block diagram of an embodiment of an asynchronous computing and rendering system, generally designated 100, constructed according to the principles of the present disclosure. The functional block diagram 100 includes a data storage unit 105, a computing cluster 110, a rendering cluster 115, a data interpretation platform 120 and a LAN 125.

The data storage unit 105 represents a system capacity data storage that is available to components of the asynchronous computing and rendering system 100. The computing cluster 110 includes a plurality of parallel compute machines, and the rendering cluster 115 includes a multiplicity of parallel rendering machines, as shown. The data interpretation platform 120 functions as the user input and viewing station for the system, and the LAN 125 provides a high speed connection between the rendering cluster 115 and the data interpretation platform 120.

Operationally, the computing cluster 110 is a dedicated computing cluster that is leveraged for user-defined large-scale data processing by a rendering system (i.e., rendering software), which runs on the rendering cluster 115 to integrate compute results. Parallel composited outputs from the multiplicity of rendering machines are provided to the data interpretation platform 120 for display and interpretation.

The asynchronous computing and rendering system 100 enables asynchronous parallel rendering and computing. In particular, the asynchronous computing and rendering system 100 hides network transfer costs between cluster machines and occurring latencies, graphic processing unit upload and download times and computing costs. By reducing these factors that usually impact system performance, the asynchronous computing and rendering system 100 is optimized for real-time visualization of large-scale data that results from raw data processing done on the fly.

Figure 2:
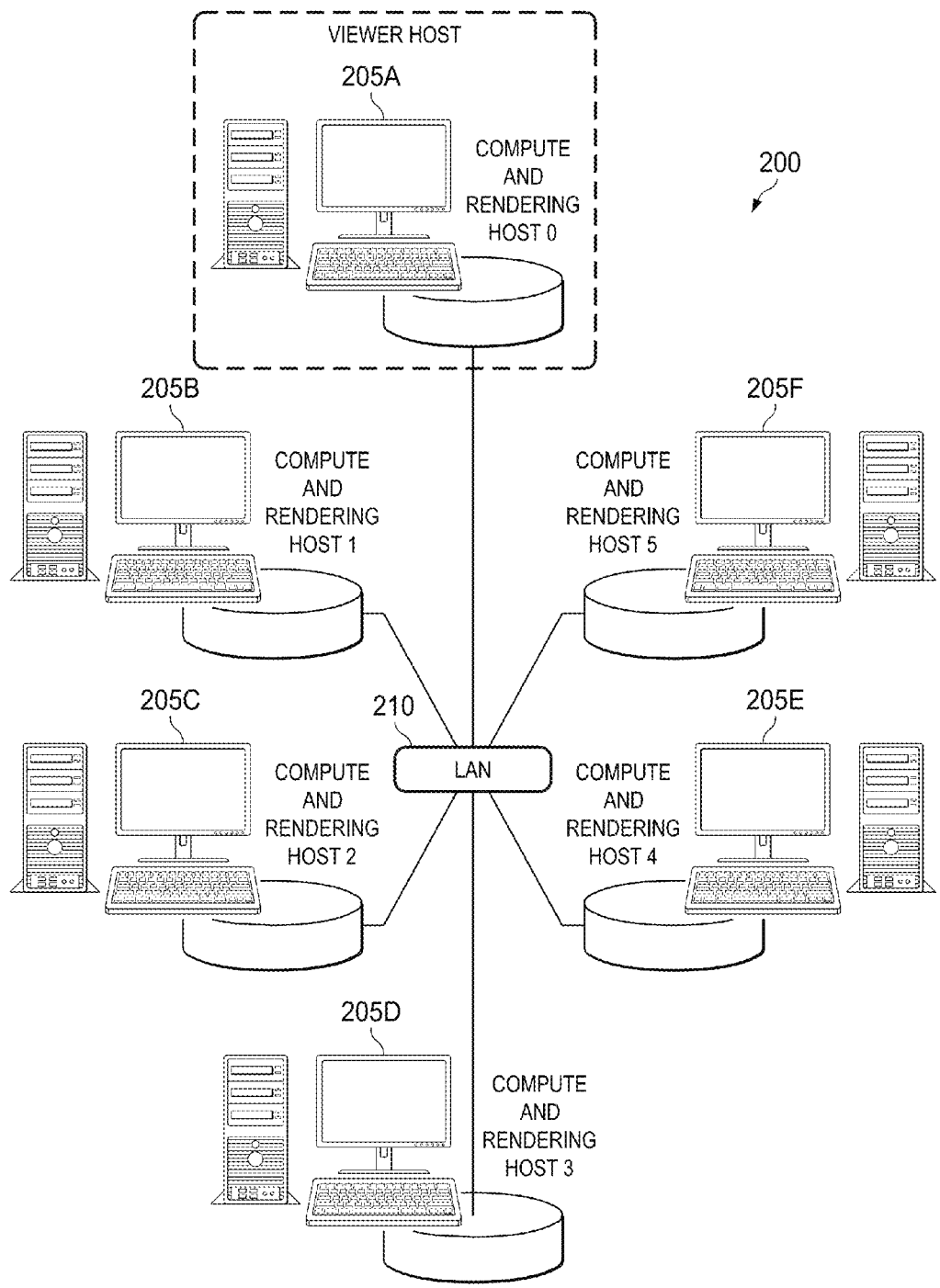
FIG. 2 illustrates an embodiment of an asynchronous computing and rendering system corresponding to the functional block diagram of FIG. 1.

FIG. 2 illustrates an embodiment of an asynchronous computing and rendering system, generally designated 200, corresponding to the functional block diagram of FIG. 1. The asynchronous computing and rendering system 200 provides an example of a system that enables rendering and computing on a joint cluster (i.e., a same physical cluster) and includes a number of compute and rendering host machines 205A-205F that employ a local area network (LAN) 210 for communication and data transfer. The compute and rendering host machine 205A is employed as a viewer host wherein user-requested analysis requests are instigated and the composited rendering results are displayed.

As an example of a possible deployment strategy, each of the compute and rendering host machines 205A-205F employs a central processing unit (CPU) having eight parallel processing cores and 24 gigabytes (GBs) of high speed memory. Additionally, each of the compute and rendering host machines 205A-205F employs two parallel graphics processing units (GPUs) wherein each has 240 parallel programmable processing cores that employ high-level programming language and four GB of high speed memory. The LAN 210 is a one GB Ethernet network.

The asynchronous computing and rendering system 200 is representative of a scalable system that is able to integrate user-defined parallel and distributed compute algorithms into a large-scale data rendering algorithm. The parallel and distributed compute algorithms can leverage dedicated compute clusters to process large-scale raw data and generate an input for scalable, large-scale data visualization using a dedicated rendering cluster. The scalable system manages compute and rendering operations asynchronously to reduce latencies and waiting times. Proper selection of scalable system cluster sizes to match a complexity of user-defined compute algorithms may provide substantially real-time interactive performance.

Figure 3:
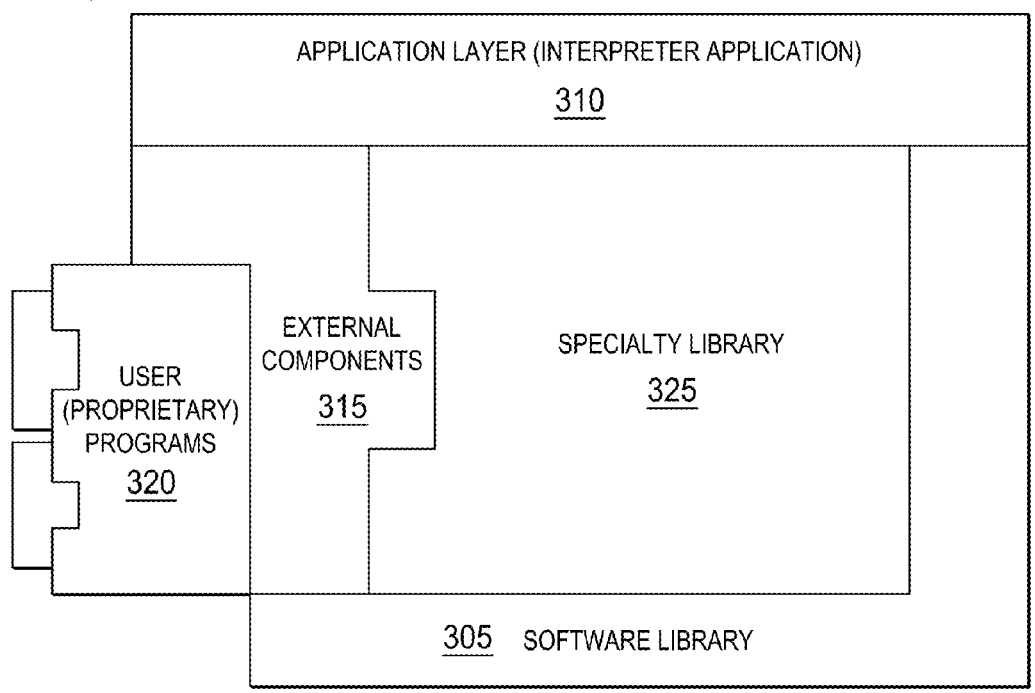
FIG. 3 illustrates a functional diagram that corresponds to one of the multiplicity of rendering machines of FIG. 1.

FIG. 3 illustrates a functional diagram, generally designated 300, that corresponds to one of the multiplicity of rendering machines of FIG. 1. The functional diagram 300 is representative of a distributed computing environment that employs a networking infrastructure, a distributed database, a distributed job model and a broadly applied application programming interface (e.g., C++). Additionally, the distributed computing environment employs a software architecture that provides intellectual property separation, a division of labor, extensibility, accessibility and exchangeability. The functional diagram 300 includes a software library 305, an application layer 310, external components 315, user proprietary programs 320 and a specialty library 325.

The software library 305 is a GPU cluster-aware software system that enables scalable rendering of large-scale data. It provides core functionality that focuses on data set management, rendering and processing. Additionally, it provides a domain-specific application programing interface that enables accessing and editing uploaded data and extending core functionality. The software library 305 also provides protection between system intellectual property (e.g., rendering algorithms) and user proprietary algorithms. The application layer 310 provides an interface to user interpretation through display visualizations and manages user-interactions. Additionally, it manages application logic by controlling functionality and workflows as well as display scene representations.

The external components 315 extend core workflow functionality through user-defined processing of data and user-defined input/output. Additionally, it facilitates the core workflow functionality being extended by relying on application programing interfaces. The external components 315 protect user or other proprietary programs (e.g., user (proprietary) programs 320) and leverage associated proprietary algorithms and file formats. The specialty library 325 provides special functionality that is targeted toward a specific large-scale data set (e.g., a software library for seismic data) required for processing.

Figure 4:
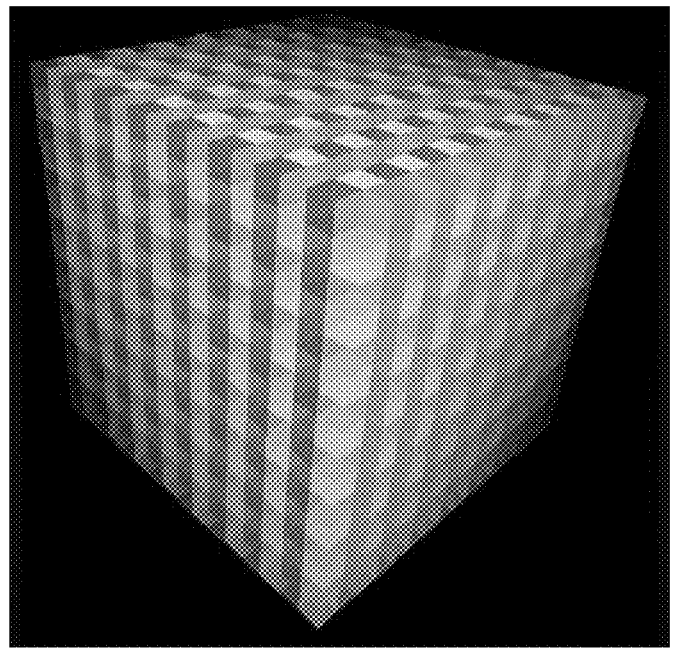
FIG. 4 illustrates an example of hierarchical data decomposition as may be applied to a large-scale data set.

FIG. 4 illustrates an example of hierarchical data decomposition, generally designated 400, as may be applied to a large-scale data set. The large-scale data set may be a seismic data set representing three dimensional subsurface data, for example. In FIG. 4, an octree-based subdivision of three dimensional data space is represented wherein each successive subdivision produces eight "children". In this example, four subdivisions have produced a total of 4096 smaller sized cubes called subregions. A size of these subregions may be such that they include $512^3$ data points. Parallel and distributed rendering algorithms employed by an asynchronous computing and rendering system decompose the three dimensional data space into these subregions and distribute them to cluster nodes. This approach is essential for a well-balanced and scalable rendering of large-scale data sets using a GPU cluster.

Another key aspect of the asynchronous computing and rendering systems described in this disclosure is that they rely on proxy geometries, which represent geometric or volumetric shapes that are able to display compute results (e.g., using texture mapping techniques). Proxy geometries may include three dimensional planes (rectangular three dimensional shapes), heightfields (heightmaps or terrain models) or voxel cubes (three dimensional volumes). Then, implementation of an asynchronous rendering and compute and integration of the compute results into a rendering system for immediate visualization generally employs the following.

Parallel and distributed rendering starts by invoking rendering tasks. These tasks are sent through the network (employing the LAN 125) to each rendering node (a rendering machine) of the rendering cluster 115. Distributing the rendering tasks and receiving them is substantially immediate. Each rendering node of the rendering cluster 115 then computes the intersection of a proxy geometry with those subregions that the rendering node has to process. This computation is done in a separate thread that runs parallel to the rendering thread on each rendering node. Furthermore, the computation is done based on a subset of subregions and in parallel on all rendering nodes, which represents a basic requirement for a scalable system.

For each subregion that is intersected by a proxy geometry, the rendering nodes creates a buffer instance, which contains information related to the position and orientation of the proxy geometry. The set of all buffer instances is passed to a user-defined computing technique. The user-defined computing technique then spawns user-defined compute tasks and sends them through a network to the dedicated compute cluster. The user-defined computing technique maintains specific knowledge of the dedicated distribution schemes for the large-scale data set (e.g., raw data) and the respective user-defined parallel and distributed computing algorithm that processes the large-scale data set. The rendering system retains a reference to each buffer instance.

While a compute is in progress, the rendering system continues with the rendering of all geometries that are defined in a three dimensional display scene that do not require any computing. When a computing task returns from the computing cluster 110 to an invoking rendering cluster machine, its results then define and populate the buffer instance contents. When the buffer instance becomes available, the rendering system will be immediately notified. The rendering system then uses the available compute results of the buffer instance for texturing the proxy geometry in a subregion. A collection of all textured proxy geometries of one rendering node represents the visualization of the large-scale data set for all the subregions of the respective rendering node. A composited result of all rendering nodes then visualizes the entire compute.

Figure 5A:
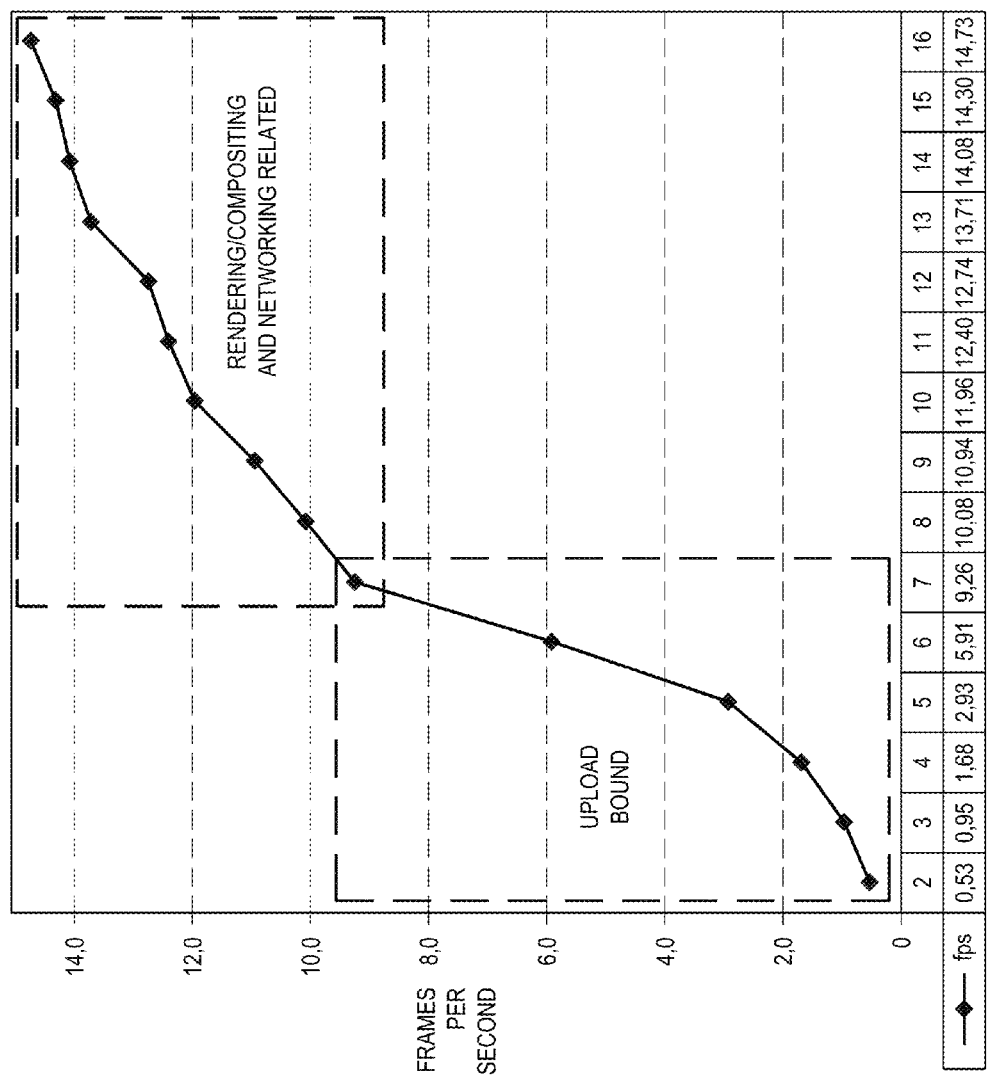
FIGS. 5A and 5B illustrate an example of a scalable performance curve and a composited result for an asynchronous computing and rendering system constructed according to the principles of the present disclosure.
Figure 5B:
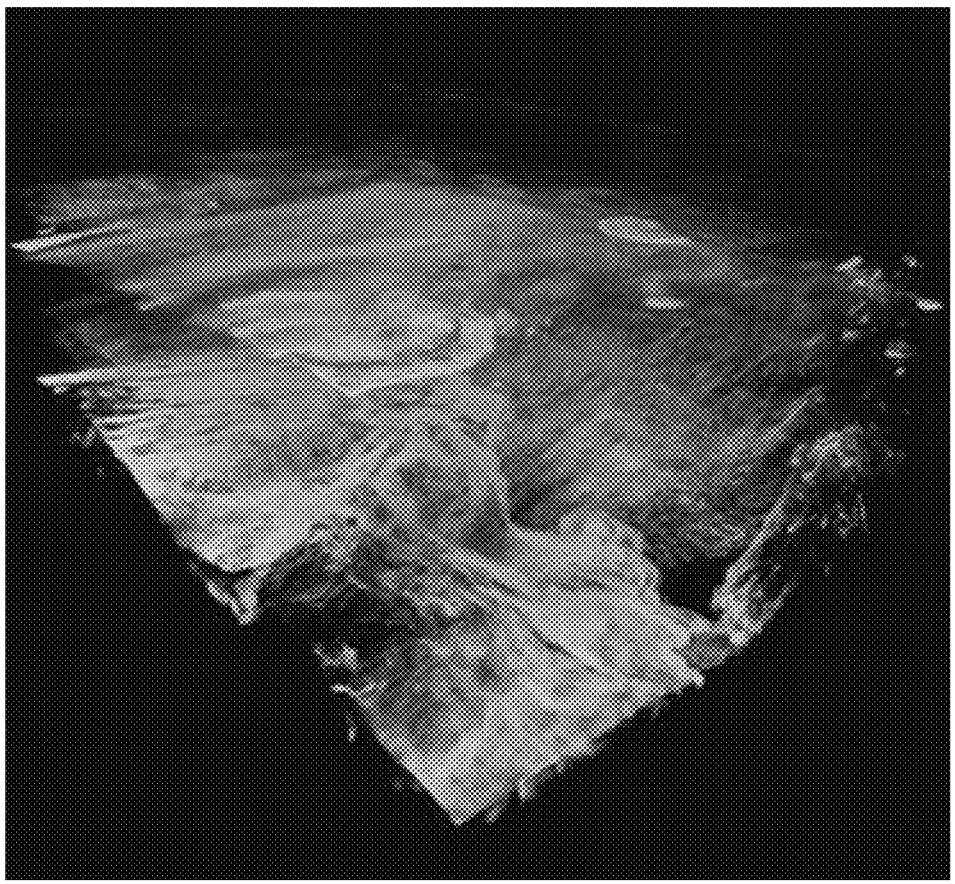

FIGS. 5A and 5B illustrate an example of a scalable performance curve and a composited result, generally designated 500 and 520, for an asynchronous computing and rendering system. The scalable performance curve 500 indicates that the frames per second for a display of the composited result 520 increases dramatically as a number of parallel rendering machines in a rendering cluster increases from two to seven. An increase in additional frames per second occurs more slowly as the number of rendering machines increases to fourteen.

Figure 6:
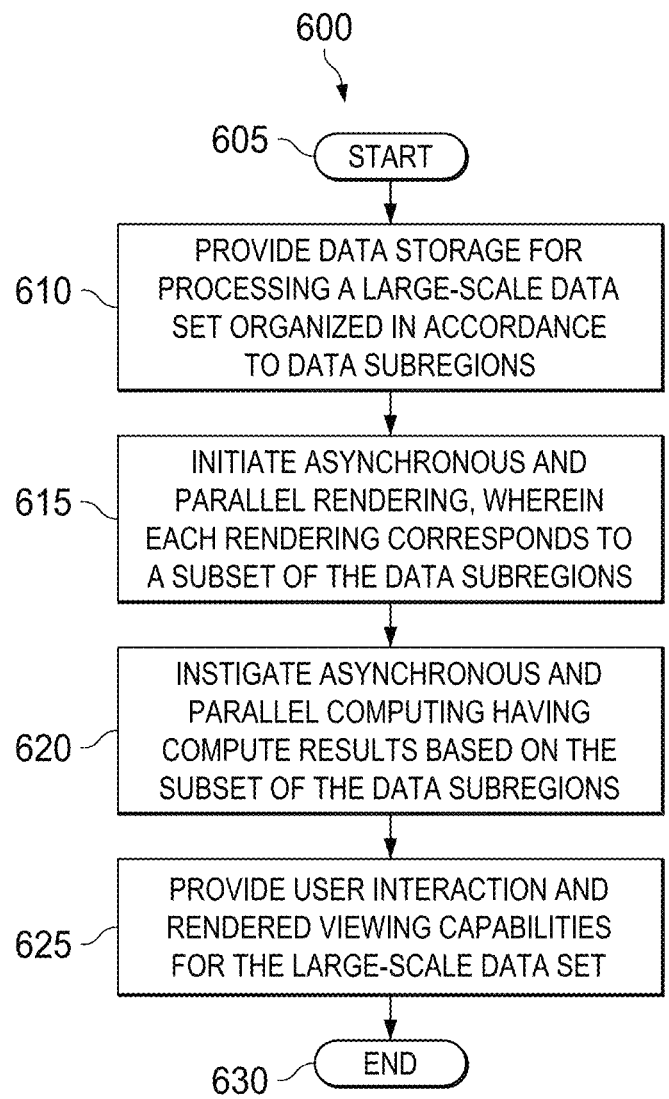
FIG. 6 illustrates an embodiment of an asynchronous computing and rendering method carried out according to the principles of the present disclosure.

FIG. 6 illustrates an embodiment of an asynchronous computing and rendering method, generally designated 600, carried out according to the principles of the present disclosure. The method 600 starts in a step 605, and data storage is provided for processing a raw data set organized in accordance to the data subregions, in a step 610. Then, in a step 615, asynchronous and parallel rendering is initiated, wherein each rendering corresponds to a subset of the data subregions. Asynchronous and parallel computing is instigated having compute results based on the subset of the data subregions, in a step 620, and user interaction and rendered viewing capabilities are provided for the large-scale data set, in a step 625.

Generally, the asynchronous and parallel rendering and computing are scalable, and each of the compute results is invoked by one asynchronous and parallel rendering. Additionally, the user interaction capability corresponds to selecting application specific functions to be performed on at least a portion of the large-scale data set, and the rendered viewing capability corresponds to a composite of separate renderings.

In one embodiment, a proxy geometry corresponding to selected data subregions is employed in providing the asynchronous and parallel rendering and the compute results. Here, each rendering calculates an intersection of the proxy geometry with the selected data subregions. In another embodiment, each rendering calculation is processed in a separate thread that runs in parallel with other rendering threads. In yet another embodiment, each rendering creates a buffer instance for each selected data subregion that is intersected by the proxy geometry. Correspondingly, the buffer instance is defined and populated by a compute result returned to an invoking rendering. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. An asynchronous computing and rendering system, comprising:
a data storage unit that provides storage for processing a large-scale data set organized in accordance to data subregions;
a computing cluster containing a parallel plurality of asynchronous computing machines that provide compute results based on the data subregions;
a rendering cluster containing a parallel multiplicity of asynchronous rendering machines, each separate from each of the parallel plurality of asynchronous computing machines of the computing cluster, coupled to the asynchronous computing machines, wherein each rendering machine renders a subset of the data subregions;
wherein a proxy geometry is employed in providing compute and rendering results of selected data subregions and each rendering machine calculates an intersection of the proxy geometry with data subregions it has to process; and
a data interpretation platform coupled to the asynchronous rendering machines that provides user interaction and rendered viewing capabilities for the large-scale data set.

2. The system as recited in claim 1 wherein the large-scale data set is a raw data set.

3. The system as recited in claim 1 wherein asynchronous computing and rendering are performed on a same physical cluster.

4. The system as recited in claim 1 wherein the asynchronous computing and rendering clusters are scalable.

5. The system as recited in claim 1 wherein each of the compute results is requested asynchronously and in parallel by the asynchronous rendering machines.

6. The system as recited in claim 1 wherein a rendering machine image generation process is done in a separate thread that runs in parallel to rendering threads on other asynchronous rendering machines.

7. The system as recited in claim 1 wherein each rendering machine creates a buffer instance for each subregion that is intersected by the proxy geometry.

8. The system as recited in claim 7 wherein the buffer instance is defined and populated by a compute result returned from a computing machine to a rendering machine that triggered the compute result.

9. The system as recited in claim 1 wherein the rendering cluster is coupled to the data interpretation platform by a local area network.

10. The system as recited in claim 1 wherein the user interaction capability corresponds to selecting application specific functions to be performed on at least a portion of the large-scale data set.

11. The system as recited in claim 1 wherein the rendered viewing capability corresponds to a composite rendering of separate renderings from the parallel multiplicity of asynchronous rendering machines.

12. An asynchronous computing and rendering method, comprising:
providing data storage for processing a large-scale data set organized in accordance to data subregions;
initiating asynchronous and parallel rendering on a rendering cluster, the rendering cluster containing a parallel plurality of asynchronous rendering machines which perform the rendering, wherein each rendering corresponds to a subset of the data subregions;
instigating asynchronous and parallel computing on a computing cluster, the computing cluster containing a parallel plurality of asynchronous computing machines, each separate from each of the parallel plurality of asynchronous rendering machines of the rendering cluster having compute results based on the subset of the data subregions;

employing proxy geometry corresponding to selected data subregions in providing the asynchronous and parallel rendering and compute results wherein each rendering calculates an intersection of the proxy geometry with the selected data subregions; and providing user interaction and rendered viewing capabilities for the large-scale data set.

13. The method as recited in claim 12 wherein the large-scale data set is a raw data set.

14. The method as recited in claim 12 wherein asynchronous computing and rendering are performed on a same physical cluster.

15. The method as recited in claim 12 wherein the asynchronous and parallel rendering and computing are scalable.

16. The method as recited in claim 12 wherein each of the compute results is requested asynchronously and in parallel by a rendering operation.

17. The method as recited in claim 12 wherein a rendering image generation process is processed in a separate thread that runs in parallel with other rendering threads.

18. The method as recited in claim 12 wherein each rendering creates a buffer instance for each selected data subregion that is intersected by the proxy geometry.

19. The method as recited in claim 18 wherein the buffer instance is defined and populated by a compute result.

20. The method as recited in claim 12 wherein the user interaction capability corresponds to selecting application specific functions to be performed on at least a portion of the large-scale data set.

21. The method as recited in claim 12 wherein the rendered viewing capability corresponds to a composite of separate renderings.

* * * * *